United States Patent [19]
Haboian et al.

[11] Patent Number: 5,668,534
[45] Date of Patent: Sep. 16, 1997

[54] CONTAINMENT FAILURE DETECTION DEVICE AND METHOD

[75] Inventors: Mark Scott Haboian, Rochester; Charles Edward Rudd, Spencerport, both of N.Y.

[73] Assignee: Eastman Kodak Company, Rochester, N.Y.

[21] Appl. No.: 324,943

[22] Filed: Oct. 18, 1994

Related U.S. Application Data

[63] Continuation of Ser. No. 989,251, Dec. 11, 1992, abandoned.

[51] Int. Cl.⁶ .................................................. G08B 21/00
[52] U.S. Cl. .......................... 340/605; 340/604; 340/626; 73/40
[58] Field of Search ........................... 340/604, 603, 340/605, 632, 611, 614, 626; 73/42, 49.2 T, 49.2 R

[56] References Cited

U.S. PATENT DOCUMENTS

| | | | |
|---|---|---|---|
| 1,096,894 | 5/1914 | Dodge | 73/46 |
| 3,100,392 | 8/1963 | Skinner | 73/46 |
| 3,719,070 | 3/1973 | Hanes | 73/37 |
| 4,704,897 | 11/1987 | Kawase et al. | 73/40.5 R |
| 4,916,938 | 4/1990 | Aikin et al. | 73/46 |
| 4,916,939 | 4/1990 | Mogel | 73/49.2 |
| 5,081,864 | 1/1992 | Zaim | 73/49.2 |

*Primary Examiner*—Jeffery Hofsass
*Assistant Examiner*—Edward Lefkowitz
*Attorney, Agent, or Firm*—Susan L. Parulski

[57] ABSTRACT

A device and method for detecting a containment failure. The device has a gas supply means (18) for providing a gas to a containment failure volume (16, 60) and for maintaining a constant gas pressure in the containment failure volume. The device also has gas flow monitoring means (26) for monitoring flow of the gas into the containment failure volume. The flow of gas into the containment failure volume is indicative of a containment failure.

17 Claims, 2 Drawing Sheets

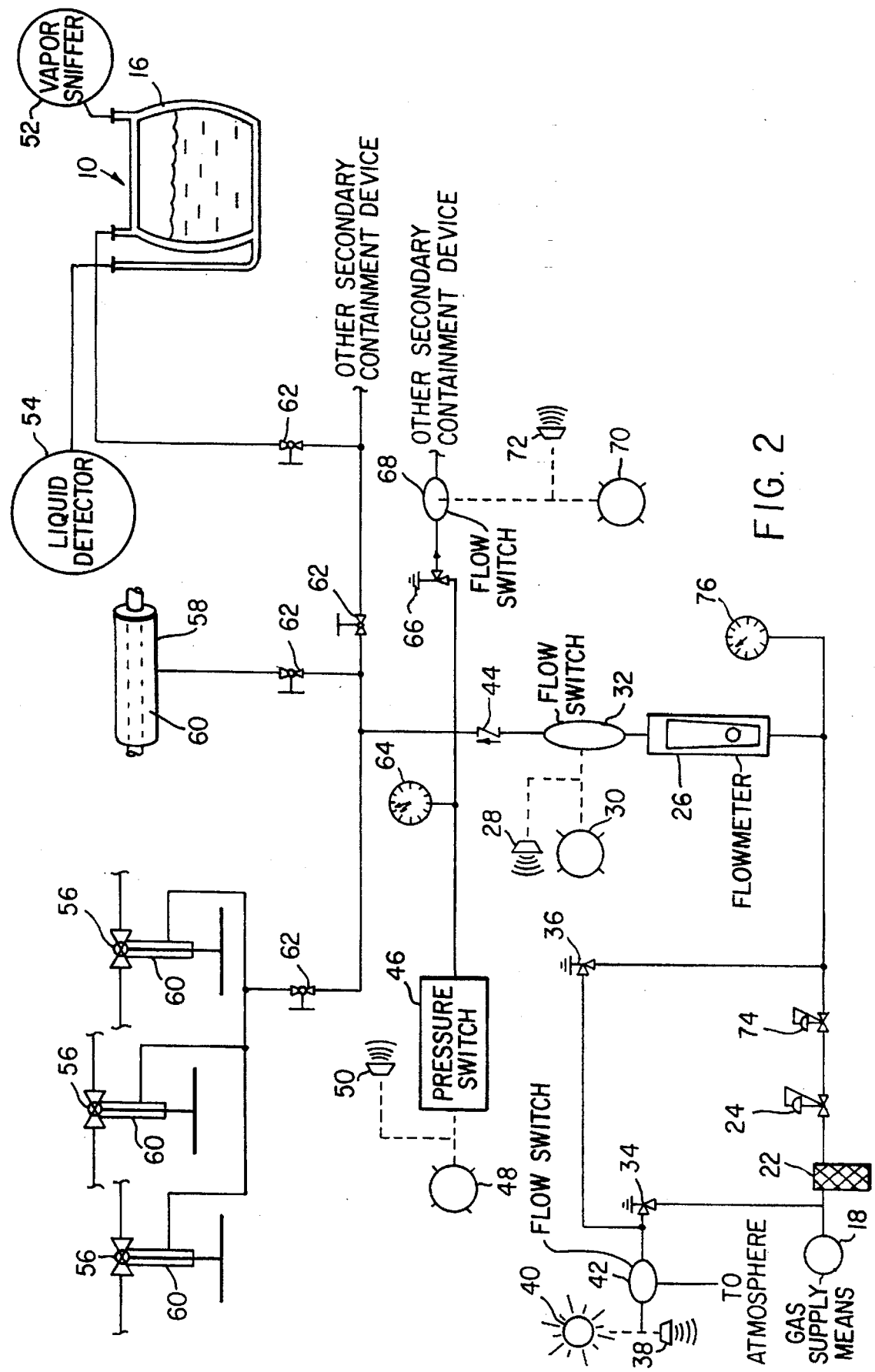

CONTAINMENT FAILURE DETECTION DEVICE AND METHOD

This is a Continuation of application Ser. No. 07/989,251, filed 11 Dec. 1992, now abandoned.

FIELD OF INVENTION

The present invention is directed to a device for monitoring for containment failure in a fluid-containing system. The present invention is also directed to a method for monitoring for containment failure in a fluid-containing system.

BACKGROUND OF THE INVENTION

In chemical processing and other industries, the manufacture, transportation, storage, and other operations involving chemicals, combustible fluids, and other hazardous materials necessitate containment and containment assurance of such materials. Increasingly, environmental and safety regulations and laws address hazardous fluids containment and containment assurance. Accordingly, there is a continuing need for containment systems and devices that comply with the laws and the regulations, and the costs associated with compliance can be significant.

U.S. Pat. No. 4,916,938 describes a leak detection system comprising a sealed interstitial space filled with a fluid maintained at an elevated pressure. The pressure decay in the space is monitored to provide indication of leakage. A disadvantage of this device is that the pressure decay characteristics can be affected by ambient temperature conditions, possibly leading to false readings or delayed or unresponsive readings.

U.S. Pat. No. 4,704,897 describes a method for locating a leak in a block of underground pipes. The pipes are sealed off and an inert gas introduced therein. Suction is then applied to draw air. A flowmeter and oxygen sensors are employed to measure the volume of gas being drawn and the movement of air from the location of the leak through the pipes, upon which the location of the leak can be ascertained. A disadvantage is that, although the method may detect a primary system leak, it does not provide the means for detecting secondary containment failures.

U.S. Pat. No. 3,719,070 describes a leak detection system for an underwater device for detecting leakage into an area between a primary seal and a secondary seal. A pressure gauge is provided to monitor for pressure increase between the seals. A disadvantage is that minor leaks can be difficult to detect, dependent on leak location and equipment sensitivity. Another disadvantage is that fluctuating ambient and service conditions can affect the sensitivity of the leak pressure measurement, which can cause false, delayed, or unregistered leakage indications.

U.S. Pat. No. 3,100,392 describes a test apparatus for checking flow through a power steering mechanism. Although FIGS. 3 and 4 mention a flowmeter, the reference does not elaborate on its use. The device appears to utilize a standard pressure indicator for leak detection. Accordingly, the device has the same disadvantage of other such prior art devices, in which it is subject to spurious readings due to pressure fluctuations under nonleakage conditions. Furthermore, the device described is a valve testing apparatus and does not monitor a sealed containment volume nor address the need for on-line operational capability.

U.S. Pat. No. 1,096,894 describes a meter tube for measuring steam leakage differential pressure to indicate process leakage flow rate through the shaft packing of a steam turbine. A disadvantage of the system is that it directly measures process leakage of a system fluid, and does not provide the capability of remotely sensing a containment failure in a sealed containment volume.

It is an object of the invention to provide a leak detection device and method that can detect small seal failures or low-level leaks without being susceptible to sensitivity changes due to fluctuations in ambient conditions. Another object of the invention is to provide a device and method that can indicate a containment failure, whether it is due to a failure in primary containment, secondary containment, or both, and in a system having a plurality of containment areas.

SUMMARY OF THE INVENTION

In accordance with the invention, there is provided, in a fluid-containing system having a monitorable containment failure volume, a device for detecting a containment failure, comprising:

gas supply means for providing a gas to the containment failure volume and for maintaining a constant gas pressure in the containment failure volume; and gas flow monitoring means for monitoring flow of the gas into the containment failure volume indicative of a containment failure.

In another aspect of the invention, there is provided a method of detecting a containment failure in a fluid-containing system having a monitorable containment failure volume, comprising the steps of:

providing a gas to the containment failure volume;

maintaining a constant gas pressure in the containment failure volume; and monitoring for flow of the gas into the containment failure volume to indicate a containment failure.

The invention provides a device and method that can readily indicate a small failure in a primary seal or a secondary seal and indicate the presence of a leak. The invention also provides such a device and method that is not subject to substantial fluctuations in operating capability due to process system changes or fluctuating ambient conditions.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 is a schematic view of a containment failure detection system in accordance with the invention in which a plurality of containment failure volumes are monitored by one gas supply and monitoring means.

DESCRIPTION OF THE PREFERRED EMBODIMENTS

Figure 1:
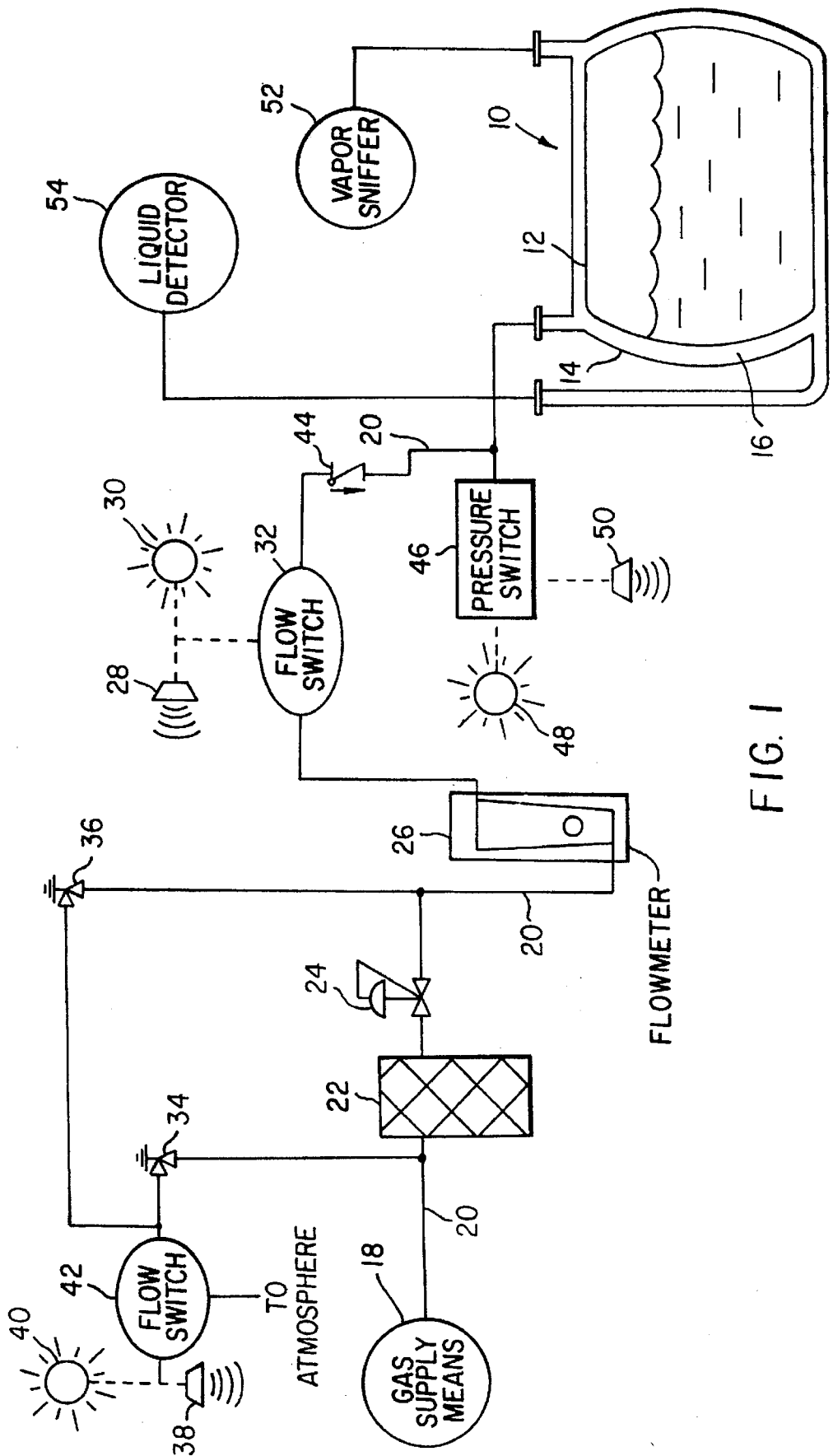
FIG. 1 is a schematic view of a containment failure detection system in accordance with the invention in which a storage tank containment failure volume is monitored for containment failure.

FIG. 1 illustrates a containment failure detection system in accordance with the invention. A liquid for which containment assurance is desired is stored in storage tank 10. Tank 10 has inner wall 12 providing primary containment of the stored liquid and outer wall 14 providing secondary containment of the stored liquid. Interstitial space 16 between walls 12 and 14 is a monitorable containment failure volume. An inert gas, such as nitrogen, is provided by constant pressure gas supply means 18 via line 20 to space 16. "Inert gas" as used herein includes any gas that is substantially nonreactive with or nonharmful to the contained process fluid and apparatus. One skilled in the art can readily select an appropriate such gas for a particular system design.

Under non-gas leaking conditions, as when walls 12 and 14 are intact, line 20 and space 16 hold the gas at a constant pressure. As used herein, "constant pressure" is defined to mean a constant pressure of gas for the ambient temperature experienced by the gas at the particular location. The actual gas pressure at a location is a temperature and location-dependent function, the latter depending on whether the location is upstream or downstream of gas pressure regulating means, as is further described below. Pressure may also vary depending on how gas supply means 18 varies with temperature and whether gas supply means 18 has pressure change compensation means associated therewith. The invention is designed to operate effectively despite such variations in static pressure conditions.

Filter 22 is provided as means for filtering the gas supplied by gas supply means 18. Pressure regulating valve 24 sets the desired gas pressure in space 16. Flowmeter 26, and alarm 28 and light 30 actuated by flow switch 32, provide the indications of gas flow indicative of a containment failure. Pressure regulating valve 24 typically should be set to maintain a pressure in space 16 higher than the process pressure plus static head pressure within the primary containment space, which in FIG. 1 is the process pressure in the primary system enclosed by wall 12. Thus, if a failure occurs in primary containment such as a rupture in wall 12, process fluid or gas should not flow into line 20, or at least not flow into those portions of space 16 or line 20 at which the gas pressure is not less than the process fluid static head pressure. If desired, venting equipment (not shown) can be provided to vent off leaking primary system gases of fluids, in which case the flow of gas through line 20 and flowmeter 26 would indicate the existence of the leak.

The design failure strength of walls 12 and 14 can vary, depending on process or equipment conditions such as primary system design pressure, temperature, materials of construction, and the like. The choice of gas supply pressure can also vary, with pressure regulating valve 24 providing the capability to adjust the gas pressure incident on walls 12 and 14. Walls 12 and 14 can be provided with rupture seals (not shown) designed to fail at pressures during overpressurization events that are less than the design failure pressures of wall 12 or wall 14 to protect the integrity of walls 12 and 14. Accordingly, it may be desired to maintain the gas pressure in space 16 at a level well below the pressure at the gas supply means outlet. In a preferred embodiment, a gas supply pressure of about 25 psi (172 kPa) is lowered by valve 24 to a downstream pressure in the range of from about 2 cm of water column to about 15 cm of water column. If desired, a pressure relief valve or valves, for example valve 34 and valve 36, can optionally be provided to alleviate an overpressurization condition in line 20, which can be signalled by alarm 38 and indicating light 40 actuated by flow switch 42. Similarly, a low pressure indicating means (not shown) can also be provided to indicate a too low gas pressure in line 20.

Some primary systems can be subject to varying process conditions and pressures, such as pressures ranging from atmospheric or low shutdown pressures to high operating pressures. Containment devices in such systems can be provided that have soft, unidirectional seals or packing to protect system components. In order to maintain system integrity and avoid damaging the soft seals, a lower gas pressure in space 16 may be desired. A high primary system pressure event, however, can rupture a primary containment such as wall 12, and it may be desirable to protect the leak detection system from the high pressure. Accordingly, check valve 44 is provided to prevent reverse flow through line 20 toward gas supply means 18. The high pressure condition is indicated by pressure switch 46 actuating light 48 and alarm 50, indicating the containment failure even absent gas flow from gas supply means 18 to the location of the failure. Additional leak monitoring means can be provided, such as vapor sniffer 52 and liquid detector 54, as secondary or backup indicators of leakage into space 16.

FIG. 2 illustrates an embodiment of the invention having a plurality of secondary containment devices and monitoring means. Double stem seal valves 56, and double wall piping 58 each have containment failure volume 60 adjacent to a primary seal, a secondary seal, or both as described above for tank 10. Gas supply means 18 is in communication with each containment failure volume 60. A primary or secondary seal failure adjacent to any one or more of containment failure volumes 60 leading to gas flow thereto from gas supply means 18 will thus be indicated by flowmeter 26, alarm 28, and light 30. Isolation valves 62 are provided should it be desired to seal off one area of the system from another, such as for leak detection, leak isolation, and maintenance. Pressure gauge 64 can be provided as assurance that gas-containing lines are pressurized and are at the desired set static pressure. Pressure relief valves 66, and 34 and 36, respectively, are means for preventing overpressurization of the gas-containing lines or other components positioned between gas supply means 18 and containment failure volumes 60, and between gas supply means 18 and space 16, respectively. Such means help maintain system integrity and avoidance of damage to system components, the containment failure system, or containment seals downstream of check valve 44 due to pressure transients, overpressurization conditions due to primary system leakage into the gas lines, and the like. If desired, means responsive to pressure or flow changes, such as pressure switch 46 (described above) and flow switch 68, can be provided to alert the operator of such system fluctuations. Flow switch 68 actuates indicating light 70 and alarm 72. Also, further gas pressure regulating means such as precision pressure regulating valve 74 can be provided to establish a precise gas pressure in the lines to the containment failure volumes. Other monitoring devices such as pressure gauge 76 can be provided where desired.

Referring again to FIG. 1, upon a failure in wall 12, wall 14, or a failure in a wall rupture seal, and when primary system pressure is less than gas pressure in space 16, gas flows from gas supply means 18 through line 20, filter 22, regulating valve 24, flowmeter 26, and flow switch 32 into space 16 and through the breach in containment. Although the gas flow can be continuous or noncontinuous, depending on the location of the containment breach, even a temporary flow condition is capable of detection. Flowmeter 26 or flow switch 32 can indicate the occurrence of the gas flow, alerting the operator of the containment failure.

The invention therefore provides a useful containment failure detection system and method which can be readily used in conjunction with leak detection and leak isolation equipment. The invention avoids the prior art problem of false readings caused by pressure changes due to ambient conditions since its operating principle is based not simply on a change in static pressure but rather on gas flow into the containment leakage volume. The invention can detect containment failures that are difficult to detect with other detection systems, such as those that rely on visual leak detection, measurable pressure changes, and constant ambient conditions. Visual detection is not reliable when a leak is not readily observable or is occluded by environmental conditions such as dirt, ice, ambient temperature variations, or the like. Leak detectors relying on pressure measurements can be prone to false readings and, in cases of small leaks or under changing ambient conditions, may not register at all. The device and method of the invention satisfy various government laws and regulations requiring leak containment, monitoring, and detection in fluid-containing systems.

The invention has been described in detail with particular reference to a preferred embodiment thereof, but it will be understood that variations and modifications can be effected within the spirit and scope of the invention.

What is claimed is:

1. A method of detecting a containment failure in a fluid-containing system having a monitorable containment failure volume, comprising the steps of:

supplying a supply of gas to a containment failure volume;

maintaining a constant pressure of said gas supply in the containment failure volume;

monitoring for an increase in pressure in said containment failure volume as indicative of leakage into said containment failure volume from said fluid-containing system when said pressure of said containment failure volume is lower than a pressure within the fluid-containing system; and monitoring for flow from said gas supply to said containment failure volume as indicative of leakage from said containment failure volume when said pressure of said containment failure volume is higher than the pressure within the fluid-containing system.

2. The method of claim 1, further comprising the step of preventing flow reversal from said containment failure volume to said gas supply when an increase in pressure in said containment failure volume is detected.

3. The method of claim 1, further comprising the step of monitoring for overpressurization of said gas supply and releasing said gas supply overpressurization when said gas supply overpressurization is detected.

4. An apparatus for detecting a containment failure, comprising:

a fluid storage vessel having an inner wall and outer wall defining a containment failure volume therebetween;

supply means for providing a supply of gas to said containment failure volume;

pressure monitoring means for monitoring an increase in pressure in said containment failure volume as indicative of leakage into said containment failure volume from said fluid storage vessel when said pressure of said containment failure volume is lower than a pressure within the fluid storage vessel; and flow monitoring means for monitoring flow from said supply means to said containment failure volume as indicative of leakage from said containment failure volume when said pressure of said containment failure volume is higher than the pressure within the fluid storage vessel.

5. The apparatus of claim 4, further comprising prevention means for preventing flow reversal from said containment failure volume to said supply means.

6. The apparatus of claim 5 wherein said prevention means is positioned between said containment failure volume and said supply means.

7. The apparatus of claim 4 further comprising release means for releasing overpressurized gas in said containment failure volume.

8. The apparatus of claim 7 further comprising prevention means for preventing flow reversal from said containment failure volume to said supply means, and said release means is positioned between said containment failure volume and said prevention means.

9. The apparatus of claim 4 further comprising means for releasing overpressurization from said supply means.

10. The apparatus of claim 9 further comprising prevention means for preventing flow reversal from said containment failure volume to said supply means, and said means for releasing overpressurization from said supply means is positioned between said supply means and said prevention means.

11. The apparatus of claim 6 wherein said pressure monitoring means is positioned between said containment failure volume and said prevention means.

12. The apparatus of claim 4 wherein said inner wall provides primary containment of a stored fluid, said outer wall provides secondary containment of said stored fluid, and said outer wall surrounds said inner wall.

13. The apparatus of claim 4 wherein said supply means provides nitrogen gas.

14. The apparatus of claim 4 further comprising a plurality of containment failure volumes wherein said supply means is in communication with each containment failure volume.

15. The apparatus of claim 4 further comprising a vapor sniffer in communication with said containment failure volume for monitoring leakage into said containment failure volume.

16. The apparatus of claim 4 further comprising a liquid detector in communication with said containment failure volume for monitoring leakage into said containment failure volume.

17. An apparatus for detecting a containment failure, comprising:

a fluid storage vessel having an inner wall and outer wall defining a containment failure volume therebetween;

supply means for providing a supply of gas to said containment failure volume;

prevention means positioned between said containment failure volume and said supply means for preventing flow reversal from said containment failure volume to said supply means;

pressure monitoring means positioned between said containment failure volume and said prevention means for monitoring an increase in pressure in said containment failure volume as indicative of leakage into said containment failure volume from said fluid storage vessel when said pressure of said containment failure volume is lower than a pressure within the fluid storage vessel;

flow monitoring means for monitoring flow from said supply means to said containment failure volume as indicative of leakage from said containment failure volume when said pressure of said containment failure volume is higher than the pressure within the fluid storage vessel; and means positioned between said supply means and said prevention means for releasing an increase in pressure from said supply means.

* * * * *